Dec. 20, 1966  W. B. BANKS  3,292,422
METHOD OF AND APPARATUS FOR MEASURING VISCOSITY
Filed June 23, 1964  2 Sheets-Sheet 1

William B. Banks
INVENTOR.

BY
ATTORNEY.

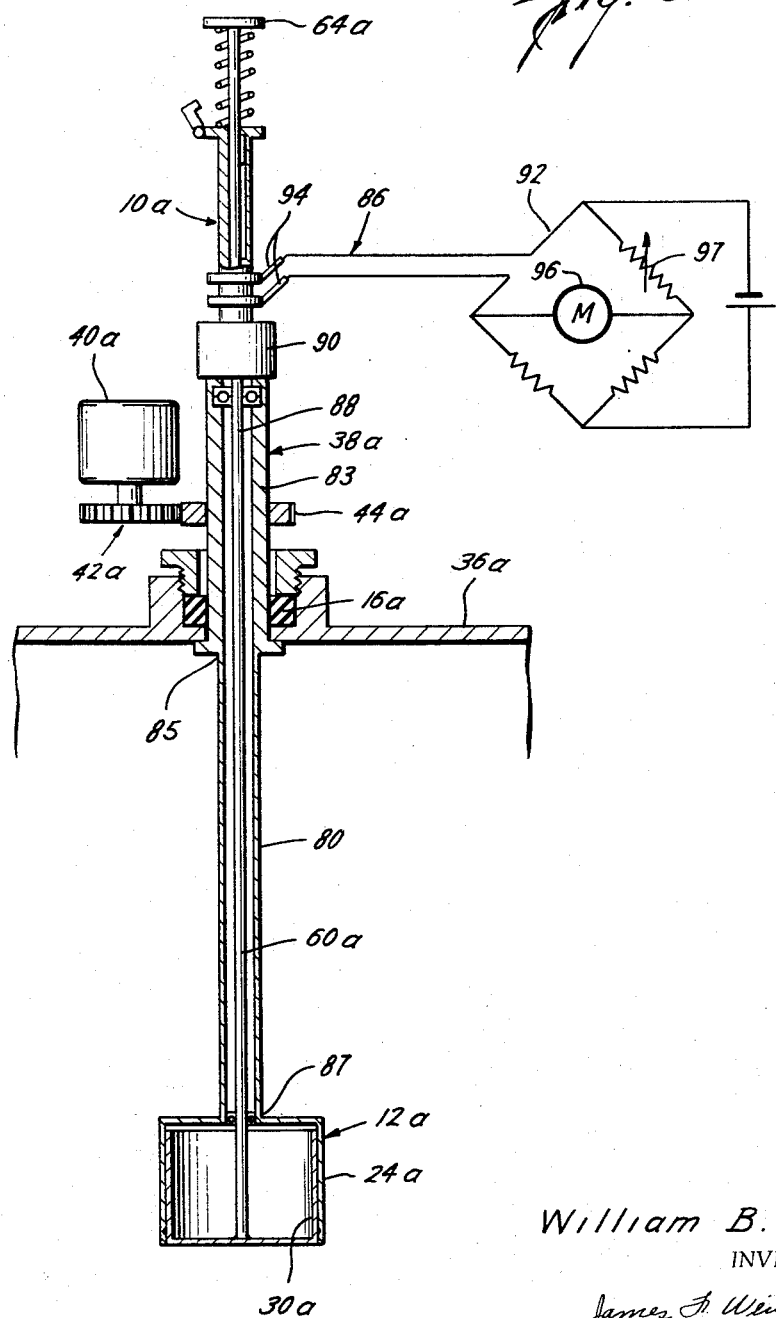

United States Patent Office 3,292,422
Patented Dec. 20, 1966

3,292,422
METHOD OF AND APPARATUS FOR MEASURING VISCOSITY
William B. Banks, Houston, Tex., assignor to Automation Products, Inc., Houston, Tex., a corporation of Texas
Filed June 23, 1964, Ser. No. 377,320
9 Claims. (Cl. 73—59)

The present invention relates to a method of and an apparatus for measuring viscosity, and more particularly, relates to a method of and apparatus for measuring viscosity of a fluid in a container through a seal by a rotating member.

While measuring viscosity by measuring the force reaction to a member driven in the fluid to be measured is old, it has not been possible in the past to obtain accurate viscosity measurements in a closed container because the measurement must be taken through a seal in the container. That is, the seal exerts a retarding force on the measuring linkage thereby preventing any accurate measurement of the shearing torque between the rotating member and the fluid being measured. Furthermore, while the effects of the seal on the measurement may be initially measured and taken into account on the viscosity measurements, this has not been satisfactory as the effect of the seal on the measurement linkage varies with the operating conditions such as temperature, pressure, and wear. Furthermore, the surface of the rotating member becomes built up with deposits from the fluid being measured and thereby provides an additional source of inaccuracy as this changes the shear reaction of the fluid to the surface of the rotating member.

Therefore, it is a general object of the present invention to provide a method of and an apparatus for measuring viscosity of a fluid in a container through a seal by a rotating member in the fluid wherein inaccuracies in the viscosity measurement may be avoided.

A still further object of the present invention is the provision of a method of and an apparatus for measuring viscosity of a fluid in a container through a seal by a rotating member wherein a surface of the rotating member may be periodically cleaned.

Yet a further object of the present invention is the provision of a method of and an apparatus for measuring viscosity of a fluid in a container through a seal by means of a rotating member wherein the effects of the seal and deposits on the rotating member are accurately compensated for.

Yet a further object of the present invention is the provision of a method of and an apparatus for measuring viscosity of a fluid in a container through a seal by a pair of telescoping members wherein means are provided for moving one of the members relative to the other thereby cleaning the coacting telescoping surfaces to provide a clean surface on which the force reaction of the fluid will provide an accurate indication of the viscosity of the fluid.

Yet a further object of the present invention is the provision of a method of and an apparatus for measuring viscosity of a fluid in a container through a seal by a pair of telescoping members which may be longitudinally moved relatively to each other thereby cleaning their coacting telescoping surfaces so that shear measurements may be taken before and after the members are moved relatively to each other to provide an accurate measurement of the viscosity of the fluid on the newly cleaned surfaces.

Still a further object of the present invention is the provision of a method of and an apparatus for measuring viscosity of a fluid in a container through a seal by means of a rotating member by providing a first tubular member positioned in the container, a first rotatable rod extending through a seal in the container and connected to the first tubular member for rotating said member, a second tubular member telescopically positioned in said member, a second rotatable rod connected to the second member and extending out of the container, said second rod being longitudinally movable relative to the first member whereby the first and second members may be longitudinally moved relative to each other for cleaning the telescoping surfaces of said members, and means for measuring the force reaction of the fluid to the members.

Still a further object of the present invention is the provision of a method of and an apparatus for measuring viscosity of a fluid in a container through a seal by rotatably driving a pair of telescoping tubular members in the container, longitudinally telescoping the tubular members towards each other, zeroing a measuring instrument measuring the force reaction of the rotating members to the fluid, and telescoping said tubular members away from each other thereby providing a new and clean measuring surface, and again measuring the force reaction of the rotating members to the fluid which will provide a measurement of the viscosity of the fluid by the clean surface.

Other and further objects, features and advantages will be apparent from the following description of presently preferred embodiments of the invention, given for the purpose of disclosure, and taken in conjunction with the accompanying drawings, where like character references designate like parts throughout the several views and where, FIGURE 1 is an elevational schematic, in cross section, illustrating one apparatus according to the present invention, wherein the rotating members are in their extended position.

FIGURE 3 is an elevational view, partly schematic and in cross-section, illustrating a modified apparatus according to the present invention wherein the rotating members are in their retracted positions.

Figure 1:
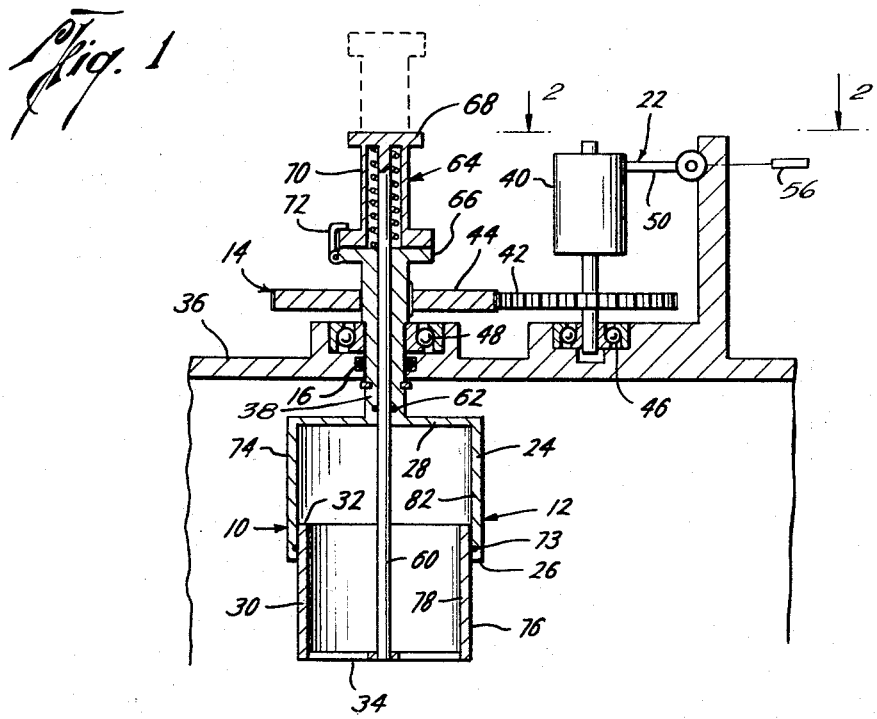

Referring now to the drawings, and particularly to FIGURE 1, the reference numeral 10 generally designates the viscosity meter of the present invention and generally includes a rotatable member 12, a rotatable drive means 14, a seal 16, and a suitable measuring means 22 for measuring the force reaction of the fluid on the rotatable member 12.

The rotatable member 12 generally includes two rotatable members which may be telescopically moved relative to each other. The rotatable member 12, by example only may include a cylindrical member 24 having a first open end 26 and a second closed end 28 and a second tubular member 30 which is telescopically movable inside of the member 24 and also includes an open end 32 and a closed end 34. As is common in viscosity measurements, the member 12 is rotated relative to the fluid and the force reaction or shearing torque of the fluid relative to the surface of the member 12 is a measurement of the viscosity of the fluid present in the container 36.

Figure 2:
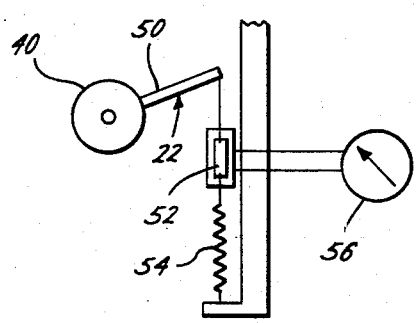
FIGURE 2 is a cross-sectional view taken along the line 2—2 of FIGURE 1.

In order to rotate the member 12, the rotatable drive means 14 includes a rotatable rod or shaft 38 connected to the member 12 such as to the end 28 of member 24 and extends through a conventional seal 16 in the wall of the container 36, and is in turn suitably driven by a constant speed motor 40, which may be by example only a synchronous motor, and which provides a drive through gears 42 and 44. In addition, suitable bearings 46 and 48 are provided around the various drive shafts. Thus, the motor 40 may rotate the rotatable rod 38 and thus rotates the member 12 relative to the fluid in the container 36. And suitable measuring means 22 is provided, which by way of example only may include a torque arm 50 connected to the housing of the motor 40 and also connected to a suitable potentiometer 52 and spring 54. Thus, assuming that the motor rotates in a direction to cause the motor housing and arm 50 to move in a counter-clockwise direction, as best seen in FIGURE 2, against the action of the spring 54, the conventional potentiometer 52 is correspondingly moved to provide a read-out on a suitable indicating meter 56. Thus, the amount of torque exerted by the motor 40 on the rotatable shaft 38 is indicated on the read-out meter 56.

However, while the torque indicated on the read-out meter 56 includes an indication of the shearing torque or force reaction of the member 12 to the fluid, which is an indication of the viscosity, the reading also includes the torque force applied by the seal 16 against the rotatable shaft 38. Furthermore, the force exerted by the seal 16 on the rotating shaft 38 may vary with operating conditions such as pressure, temperature and use. In addition, the surface of the member 12 which is in contact with the fluid is subject to having deposits build up on the surface thereby varying the force reaction of the member 12 relative to the fluid in which it rotates, and thus causing errors in the read-out. Therefore, the read-out meter 56 does not provide an accurate measurement of only the shearing torque between the member 12 and the fluid so as to provide an accurate viscosity measurement.

Therefore, the present invention is directed to providing an apparatus for and a method of compensating for the various inaccuracies by providing a self-cleaning viscosity apparatus which may be periodically actuated to provide a clean surface on the rotating member 12 to contact the fluid for measuring the viscosity. Thus, it is noted that the rotating member 12 consists of two members 24 and 30, one of which telescopes within the other. As previously mentioned, a rotatable rod 38 is connected to member 24 for rotating members 24 and 30 which are rotatably secured by friction or suitable keying means (not shown). And a longitudinally movable rod 60 is provided connected to tubular member 30 such as to closed end 34 and extends out of the container 36 such as through rod 38 and past seal 62. Thus, rod 60 may be longitudinally moved relative to the rotatable member 12 so as to move tubular member 30 relative to tubular member 24. Suitable means may be provided such as moving means 64 for moving the telescoping members 24 and 30 in either a retracted or extended position relative to each other. Thus, the moving means may include a shoulder 66 on the rotatable rod 38 and a shoulder 68 on the rod 60 and a spring 70 yieldably urging the shoulders 66 and 68 away from each other so as to move the tubular members 30 and 24 to a normally retracted position. And a latch member 72 may be provided for latching the rods 60 and 38 in the manner shown in FIGURE 1 so as to position the tubular members 30 and 24 in an extended position relative to each other as shown in FIGURE 1.

Referring still to FIGURE 1, it is noted that the tubular members 30 and 24 may be telescopically positioned relative to each other in a retracted or an extended position. If the members 30 and 24 are in a retracted position, the only exterior tubular surface exposed to the fluid will be the exterior surface 74 of the tubular member 24. Since the surface 74 will be in contact with the fluid at all times, deposits will build up on this surface and, of course, if the surface becomes contaminated, the shear reaction force of that surface to the fluid will change and will not provide a true measurement of viscosity of the member 12 relative to the fluid. However, when the tubular member 30 is extended relative to the tubular member 24, a surface 76 on the outer tubular surface of the tubular member 30 between the closed end 34 of member 30 and the open end 26 of the tubular member 24 will be presented to the fluid in the container 36. It is noted that this surface 76 will be cleaned when the member 30 has been retracted and thus will not be coated up with deposits. An annular seal 73 is provided to contact and clean surface 76, if desired, in addition to the coaction of the end 26 of member 24. Therefore, if a viscosity reading is taken while the tubular member 30 is in a retracted position and again when the tubular member 30 is in an extended position the difference in the viscosity measurements will be a result of the force reaction between the clean surface 76 and the fluid in the container. This difference in force reaction or torque will be a measurement of viscosity on the clean surface 76 and thus will provide an accurate measurement of the viscosity of the fluid. That is, the measuring means 22 will provide a reading while the member 30 is in a retracted position which includes an indication of the shearing torque or force reaction on the surface 74 of the tubular member 24 and also includes the torque force applied by the seal 16 against the rotatable shaft 38. Then, after the rod 60 is pressed downwardly and the latch 72 engages shoulder 73 the tubular member 30 is moved to an extended position causing a new clean surface 76 to be presented to the fluid to be measured in addition to the other factors being measured. Thus, when the tubular member 30 is in the extended position, the measuring means 22 will measure the shearing torque or force reaction on both the surface 74 and the clean surface 76 as well as the torque force applied by the seal 16 against the rotatable shaft 38. The difference in the readings of the measuring circuit 22 between the retracted position and the extended position will be a measurement solely of the torque force due to the viscosity of the fluid acting on the clean surface 76. Thus, the other forces acting upon the rotatable rod 38 and the member 12 will be compensated for so as to provide an automatic zeroing operation that results in measuring only the viscosity of the fluid contacting the clean surface 76 of the tubular member 30 when it is in an extended position.

Of course, the closed ends 28 and 34 on the tubular members 24 and 30, respectively, may be opened so as to allow fluid passage on the interior of the member 12 so long as suitable bracing is provided. In that event, when the tubular members 30 and 24 are in a retracted position, the measuring circuit 22 will measure the viscosity effects of the surface 74 and viscosity effects of surface 78 which is the interior surface of the tubular member 30. And, of course, when the tubular member 30 is in an extended position, the differences in the read-out on the meter 56 between the retracted and the extended positions will be a measurement of the viscosity of the fluid on both the surface 76 and on the surface 82 (interior surface of member 24), both of the surfaces 76 and 82 thus being clean surfaces due to the retraction and extension of the member 30.

Of course, various modifications of a viscosity measuring apparatus utilizing the self-cleaning member 12 of the present invention may be utilized. FIGURE 3 illustrates a modification of a viscosity meter according to the present invention, the letter "a" being applied to parts corresponding to those in FIGURES 1 and 2 for convenience of reference. Thus, a member 12a is rotated by a rotatable rod 38a by a motor 40a and gears 42a and 44a through a seal 16a. Thus, as the motor 40a is actuated, the rotatable rod 38a is rotated providing a rotational movement inside of the container 36a. However, the shearing torque of the member 12a with respect to the fluid in the container 36a is measured by angular deviation in FIGURE 3 instead of torque input as in FIGURES 1 and 2. Thus, an elongate tubular resilient member 80 is provided as a portion of the rotatable rod 38a one end of which is secured to the power input shaft portion 83 of member 38a at a point inside of the container, and the second end of which is connected to the rotatable member 12a. Since the tubular member 80 is resilient, its ends 85 and 87 may turn or twist relative to each other. Thus, when the member 12a is rotated in the fluid, it will turn or twist in proportion to the viscosity of the material acting thereon and will cause an angular displacement in the resilient tubular member 80 between its ends 85 and 87. The amount of the angular deviation of the end 87 from the end 85 will be independent of any power loss caused by rotation of the rotatable rod 38a contacting the seal 16a.

The elongate rod 60a in FIGURE 3 not only provides the function, as in FIGURES 1 and 2, of moving member 30a relative to member 24a, but its lower end will rotate in accordance with the position of rotation of the end 87 and member 12a for measuring the angular deviation between the end 87 and the end 85 of tube 80. Thus, a suitable angular displacement measuring means 86 may be used outside of the container 36a to measure the angular displacement between the upper end 88 of the rod 60a relative to the upper end of rod 38a thereby indicating the angular displacement between the ends 85 and 87 of the tubular member 80. By way of example only, a potentiometer 90, one element of which is connected to the upper end 88 of rod 60a and the other element of which is connected to rod 83 may be suitably included in a conventional Wheatstone bridge circuit 92 as the unknown leg through slip rings 94 and thereby giving a reading on meter 96 which would be an indication of the angular displacement being measured and by proper calibration would be a measurement of the viscosity of the material being measured. And, similarly to FIGURES 1 and 2, a moving means 64a is provided to longitudinally move the rod 60a so as to move the tubular members 30a and 24a relative to each other.

In use, and referring now to FIGURES 1 and 2, the motor 40 drives the rotatable shaft 38 at a constant speed and thus rotates the member 12 relative to the fluid in the container 26. In order to measure only the torque effect due to the viscosity of the fluid on the surface 76, the rod 60 is longitudinally moved upwardly thereby retracting the member 30 within the member 24 and retracting the surface 76 out of contact with the fluid. This retraction also serves to clean surface 76 by its slidable coaction within member 24. The measuring means 22 then measures the amount of torque exerted by the motor 40 on the rotatable shaft 38 while the members 30 and 24 are in a retracted position. This measurement measures the torque on the system which includes the effect of the seal 16 on the rotatable shaft 38 as well as the viscosity effect of the fluid acting upon the outer surfaces of the member 24. The rod 60 is then moved downwardly thereby telescopically extending member 30 downwardly and out of member 24 and presenting a new and clean surface 76 to the fluid. Again, the measuring circuit measures the torque exerted by the motor 40 on the tubular shaft 38, but this measurement differs from the first measurement by the effect of the viscosity of the fluid on the surface 76 of the member 30. Therefore, the difference in the readings on the indicating member 56 provides an accurate measurement of only the shearing torque effect due to the clean surface 76 and the fluid to provide an accurate viscosity measurement.

Referring now to FIGURE 3, the apparatus 10a is operated first as shown therein with the rod 60a in its upward position whereby the member 30a is retracted within the member 24a so as to clean the exterior of member 30 and the motor 40a drives the rotatable shaft 38a, including the resilient member 80 and the rotatable member 12a. The meter 96 in the Wheatstone bridge circuit 92 measures the torque on the tubular member 80 and the exterior surfaces of the tubular member 24a which may or may not be an accurate measurement of viscosity because of deposits on the exterior of these members. However, the meter 96 may be zeroed by adjusting the resistor 97 after which the rod 60a is moved downwardly to telescopically extend the member 30a outwardly from the tubular member 24a to present the now clean exterior surface of the member 30a to the fluid in the container. This clean surface will be in contact with the fluid and will cause a change in the read-out meter 96 which is a measurement of only the effect of shearing torque on the exterior of the extended member 30a which provides an accurate viscosity measurement due to the viscosity of the fluid acting on the clean exterior surface of tubular member 30a.

Thus, the present invention provides a self cleaning viscosity apparatus which may be periodically cleaned and zeroed to provide an accurate viscosity measurement.

It is believed that the method of the invention is apparent from the foregoing description of presently preferred apparatus of the invention. The method, however, provides a measurement of viscosity of a fluid in a container through a seal by a pair of telescoping members by the steps of telescoping the members towards each other to clean a coacting surface, rotatably driving the members through a seal in the container, measuring the force reaction of the rotating members to the fluid, longitudinally telescoping the members away from each other thereby providing an additional and clean surface in contact with the fluid, and again measuring the force reaction of the rotating members to the fluid whereby the differences between the first and second measurements is a measurement of the viscosity of the fluid being measured.

The present invention, therefore, is well suited to carry out the objects and attain the ends and advantages mentioned as well as others inherent therein. While presently preferred embodiments of the invention are given for the purpose of disclosure, numerous changes in the details of construction, arrangement of parts, and steps of the process may be made which will readily suggest themselves to those skilled in the art, and which are encompassed within the spirit of the invention and the scope of the appended claims.

What is claimed is:

1. An apparatus for measuring viscosity comprising,
    a first member,
    means for rotating said first member in contact with the fluid to be measured,
    a second member in contact, slidably telescoping, and rotating with said first member,
    means for moving said members relative to each other to clean the contacting telescoping surfaces and present a clean surface in contact with the fluid to be measured, and
    means measuring the fluid shear torque applied to said members.

2. An apparatus for measuring viscosity of a fluid in a container through a seal comprising,
    a first member positioned in said container,
    rotatable means positioned outside said container and extending through said seal into a container for rotating said first member in contact with the fluid to be measured,
    a second member in said container slidably telescoping with and in contact with said first member,
    means sealably extending through said container for moving said members longitudinally to each other to clean the sliding contacting telescoping surfaces and present a clean surface in contact with the fluid to be measured, and
    means measuring the fluid shearing torque applied to said members.

3. A method of measuring viscosity of a fluid by a pair of slidably telescoping tubular members comprising,
    rotating said members in said fluid when they are in a retracted position,
    measuring the force reaction of the retracted rotating members to the fluid, longitudinally extending the tubular members away from each other thereby providing an additional and clean surface in contact with the fluid, and again measuring the force reaction of the rotating members to the fluid whereby the difference between the first and second measurements is a measurement of the viscosity of the fluid being measured.

4. An apparatus for measuring viscosity of a fluid in a container through a seal comprising,
- a first tubular member positioned in said container,
- a first rotatable rod extending through a seal in the container and connected to said first tubular member,
- means outside said container for rotating said first rod,
- a second tubular member telescopically positioned in said first member,
- a second rotatable rod connected to the second member and extending out of said container, said rod being longitudinally movable relative to said first member whereby the said first and second members may be longitudinally moved relative to each other for cleaning the telescoping surfaces of said members, and
- means measuring the force reaction of said fluid to said members.

5. A method of measuring viscosity of a fluid in a container through a seal by a pair of telescoping members comprising,
- rotatably driving said members in the container through said seal,
- telescopically moving one of said members relative to the second member, and
- measuring the change in the force reaction of the rotating members to the fluid before and after the telescoping movement.

6. A method of measuring viscosity of a fluid in a container through a seal by a pair of telescoping members comprising,
- rotatably driving said members through a seal in the container,
- longitudinally telescoping said members toward each other,
- zeroing a measuring instrument measuring the force reaction of the rotating members to the fluid,
- telescoping said members away from each other, and
- again measuring the force reaction of the rotating members to the fluid.

7. A method of measuring viscosity of a fluid in a container through a seal by a pair of telescoping tubular members comprising,
- longitudinally telescoping said tubular members toward each other,
- rotatably driving said members through a seal in the container,
- measuring the force reaction of the rotating members to the fluid,
- longitudinally telescoping the tubular members away from each other thereby providing an additional and clean surface in contact with the fluid, and
- again measuring the force reaction of the rotating members to the fluid whereby the differences between the first and second measurements is a measurement of the viscosity of the fluid being measured.

8. An apparatus for measuring viscosity of a fluid in a container through a seal comprising,
- a first tubular member positioned in said container, said member having a first open end and a second closed end,
- rotatable means extending through a seal in the container and connected to said closed end of the first member for rotating said first member in contact with the fluid to be measured,
- a second tubular member telescoping with said first tubular member, said second member having a first open end and a second closed end,
- a longitudinally movable rod connected to the second end of said second member and extending through said rotatable means outside of said container whereby the first and second members may be telescoped relative to each other, and
- measuring means for measuring the torque applied to the rotatable means.

9. An apparatus for measuring viscosity of a fluid in a container through a seal comprising,
- rotatable means extending through said seal in to the container,
- power means outside of said container for rotating said rotatable means,
- a resilient tube connected to said rotatable means,
- a first tubular member connected to said resilient tube and rotating in said container upon rotation of said rotatable means,
- a second tubular member telescoping in said first member,
- a rod connected to said second tubular member and extending through said rotatable means outside of said container, said rod being longitudinally movable to move said second member telescopically relative to the first member, and
- means connected to said rod and to said rotatable means for measuring the angular displacement of said first and second member caused by the effect of the fluid contacting said members.

References Cited by the Examiner

UNITED STATES PATENTS 3,069,900  12/1962  Kimberly _____ 73—59

DAVID SCHONBERG, *Primary Examiner.*